United States Patent [19]
Hashimoto

[11] Patent Number: 5,093,714
[45] Date of Patent: Mar. 3, 1992

[54] VIDEO SIGNAL PROCESSING APPARATUS
[75] Inventor: Seiji Hashimoto, Kanagawa, Japan
[73] Assignee: Canon Kabushiki Kaisha, Tokyo, Japan
[21] Appl. No.: 559,983
[22] Filed: Jul. 30, 1990

Related U.S. Application Data
[63] Continuation of Ser. No. 248,240, Sep. 19, 1988, abandoned, which is a continuation of Ser. No. 839,052, Mar. 13, 1986, abandoned.

Foreign Application Priority Data
Mar. 15, 1985 [JP] Japan ................................. 60-050630
Mar. 15, 1985 [JP] Japan ................................. 60-050631

[51] Int. Cl.$^5$ ............................................. H04N 9/42
[52] U.S. Cl. ................................... 358/11; 358/334
[58] Field of Search .............. 358/11, 12, 13, 334, 358/328, 327

[56] References Cited
U.S. PATENT DOCUMENTS

| | | | |
|---|---|---|---|
| 3,539,712 | 11/1970 | Stephens | 358/334 |
| 4,296,430 | 10/1981 | Warren | 358/328 |
| 4,329,708 | 5/1982 | Yamamoto | 358/328 |
| 4,472,746 | 9/1984 | Flory | 358/327 |
| 4,521,802 | 6/1985 | Ikeda | 358/11 |
| 4,550,336 | 10/1985 | Sepp | 358/11 |
| 4,603,351 | 7/1986 | Vreeswijk | 358/11 |
| 4,605,951 | 8/1986 | Kuribayashi | 358/11 |

Primary Examiner—James J. Groody
Assistant Examiner—David E. Harvey
Attorney, Agent, or Firm—Toren, McGeady & Associates

[57] ABSTRACT

A video signal processing apparatus is arranged to obtain, in reproducing a video signal including color difference line sequential signals, the concurrence of color difference signals for each of odd-number and even-number fields by using both the color differences line sequential signals of the odd-number and even-number fields which are concurrently generated. Any drop-out of a color difference signal in a horizontal scanning line in one of these two fields is compensated for with a color difference signal located close to the horizontal scanning line.

33 Claims, 6 Drawing Sheets

VIDEO SIGNAL PROCESSING APPARATUS

This is a continuation of application Ser. No. 07/248,240 filed Sept. 19, 1988, now abandoned, which itself is a continuation of application Ser. No. 06/839,052, filed Mar. 13, 1986 now abandoned.

BACKGROUND OF THE INVENTION

1. Field of the Invention

This invention relates to a method for reproducing a video signal including a color difference line sequential signal and more particularly to a video signal processing apparatus characterized by an arrangement to generate color difference line sequential signals adjusted to be concurrent.

2. Description of the Prior Art

Figure 1A:
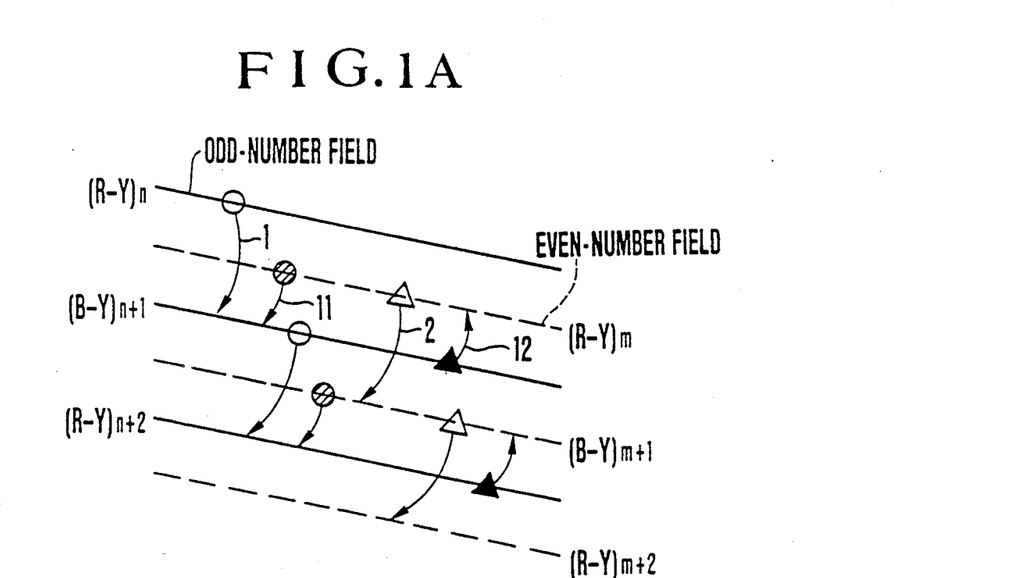
FIGS. 1A and 1B are schematic illustrations of a method for having color difference line sequential signals concurrently produced.
Figure 1B:
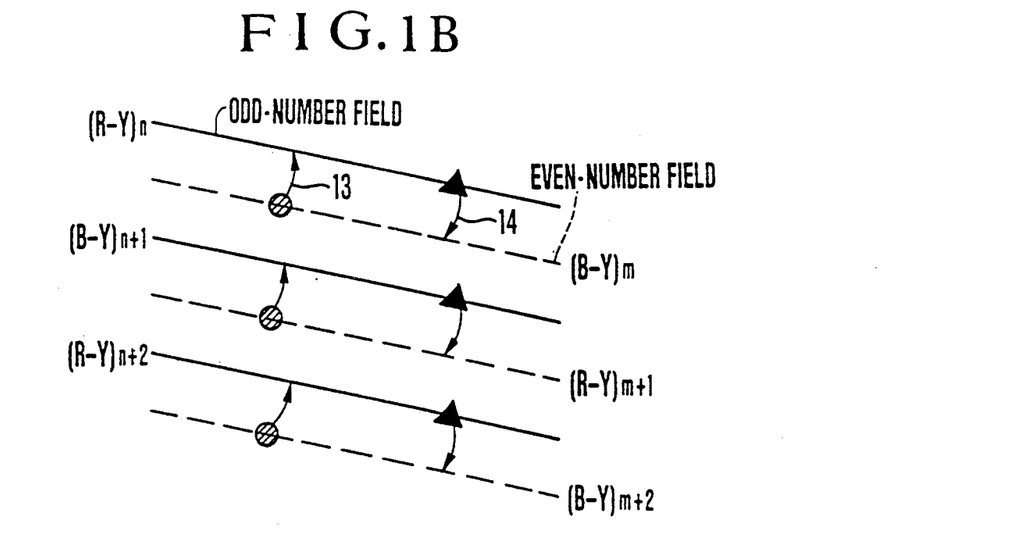

In the apparatus related to the method of the above-stated kind having color difference signals recorded in a line sequential manner, any drop-out of a color difference signal in a horizontal scanning line has heretofore been compensated for either with a color difference signal which is preceding by one horizontal scanning period (hereinafter referred to as 1H period) or with a signal obtained by averaging the signals preceding and following a 1H delay period. The details of the conventional method are as described below with reference to FIGS. 1A and 1B of the accompanying drawings:

Among all the signals that are recorded for odd-number and even-number fields, FIGS. 1A and 1B schematically show only the color difference signals that relate to the present invention. FIG. 1A represents a case where both the fields begin with a color-difference signal R−Y. FIG. 1B represents another case where the odd-number field begins with a color-difference signal R−Y while the even-number field begins with a color-difference signal B−Y. In the case of FIG. 1A, the movement of scanning lines marked with ◯ and △ in the direction of arrows 1 and 2 indicates the conventional method for making the color difference line sequential signals concurrently produced For example, the color difference signal (R−Y)n of an n line in the odd-number field is delayed for a 1H period to be made concurrent with a color difference signal (B−Y)n+1 of an n+1 line. In the even-number field, the color difference signals can be made concurrent likewise by the 1H delaying process. However, in accordance with the conventional method for making the color difference line sequential signals concurrent, vertical correlativity deteriorates because of the utilization of spatially separated color difference signals and thus this has resulted in an increase in the number of false signals.

SUMMARY OF THE INVENTION

It is an object of this invention to provide a video signal processing apparatus which generates concurrent color difference signals by utilizing both the color difference line sequential signals of odd-number and even-number fields.

It is another object of this invention to provide a video signal processing apparatus which generates concurrent color difference signals by utilizing both the color difference line sequential signals of odd-number and even-number fields and particularly by performing a computing operation on them.

To attain these objects, a video signal processing apparatus according to this invention employs a color difference line sequential signal concurrently producing method wherein, in processing a color difference line sequential signal of one field, a signal of another field which is within the same frame is utilized This method, therefore, reduces a vertical correlation distance to about one half of the distance of the conventional method. This, therefore, decreases the number of false signals and thus results in improved quality of a reproduced picture.

In another embodiment of this invention, the color difference line sequential signals are made concurrent by carrying out a computing operation on the color difference line sequential signals of both the odd-number and even-number fields. This arrangement improves the vertical correlativity and reduces the number of false signals to enhance the quality of a reproduced picture.

These and further objects and features of this invention will be apparent from the following detailed description of preferred embodiments thereof taken in connection with the accompanying drawings.

DETAILED DESCRIPTION OF THE PREFERRED EMBODIMENTS

Regarding color difference line sequential signals as frame information, a color difference signal required for obtaining concurrence is spatially located most closely. For example, referring to FIG. 1A, let us assume that the concurrence obtaining operation is to be performed on the line n+1 of an odd-number field. It is then apparent that, a color difference signal (R−Y)m of an even-number field is spatially closer to the line n+1 of the odd-number field than a color difference signal (R−Y)n of a line n of the same field. This is indicated by marks ⓠ and ▲ representing movement for obtaining concurrence in the direction of scanning line indicating arrows 11 and 12. In the case of FIG. 1B, although each field begins with a different color difference signal, the same concept as FIG. 1A also applies. In other words, a concurrence obtaining process is carried out by the movement indicated by marks ⓠ and ▲ in the direction of scanning line indicating arrows 13 and 14.

In utilizing the color difference line sequential signals of both the odd-number and even-number fields, the color difference line sequential signals must be caused to concurrently exist. For that purpose, there are some conceivable methods including a method of using memory means and another method in which two magnetic heads are arranged In the description of this embodiment, the latter method is taken up by way of example.

With the color difference line sequential signals of both of the fields concurrently obtained, the following processes must be carried out: (i) A concurrence obtaining process for the color difference signals; (ii) time matching the color difference signals with a luminance signal; and (iii) discrimination of the color difference line sequential signals for each field. An arrangement to meet this requirement is as shown in FIG. 2.

Figure 2:
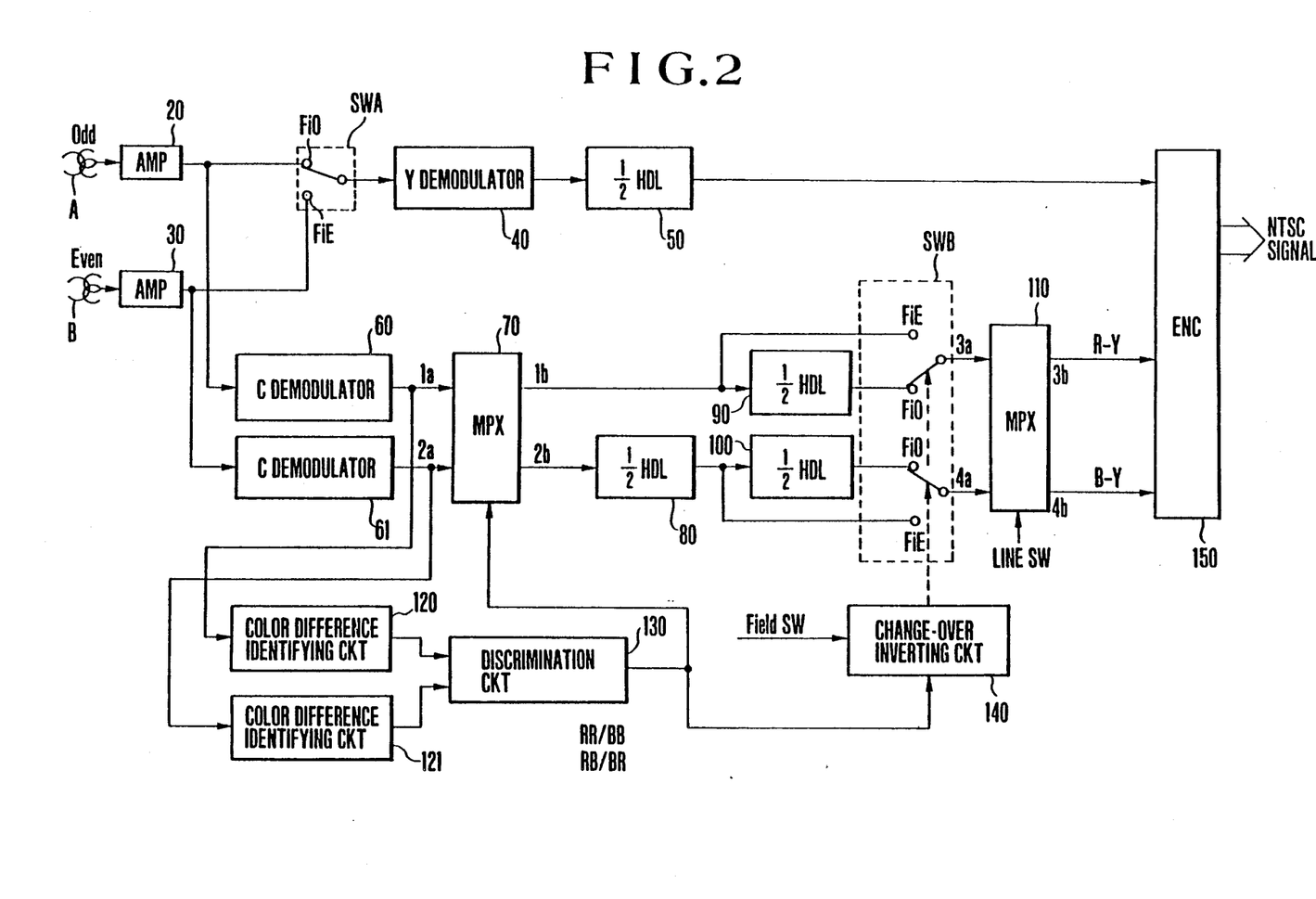
FIG. 2 is a block diagram showing a first embodiment of this invention.

FIG. 2 shows a video signal processing apparatus arranged as a first embodiment of this invention. The illustration includes two magnetic heads A and B. The head A is for the odd-number field and the other head B is for the even-number field. These heads simultaneously detect information on the odd-number and even-number fields. The information thus detected is amplified by amplifiers 20 and 30. The outputs of the amplifiers 20 and 30 are divided into a luminance signal (hereinafter referred to as Y signal) and color difference signals to be eventually produced as an NTSC signal from an encoder 150.

(i) Color difference signal concurrence obtaining process: As apparent from FIGS 1A and 1B, the color difference signals of the odd-number and even-number fields are adjustable to a concurrent state by arrangement to effect delay for a period of time $T\alpha$, corresponding to one scanning line. Generally, a time difference between the odd-number and even-number fields is $\frac{1}{2}H$. Therefore, the value of the time $T\alpha$ may be set at $\frac{1}{2}H$. This delay is effected by means of a delay line 80.

(ii) Means for time matching color difference signal with the luminance signal: With the color difference line sequential signal delayed by $\frac{1}{2}H$ through the delay line 80 for the concurrent processing purpose, there arises a time difference between the color difference signal and the luminance signal. Therefore, a delay line 50, which is arranged to effect delay by a $\frac{1}{2}H$ period, is provided in a luminance signal processing system, so that this time difference can be compensated for.

In the case of a concurrence obtaining process to be carried out during reproduction of the even-number field as shown in FIG. 1A, that is, in case that the odd-number field scanning line ▲ is to be shifted (for delaying) in the direction of arrow 12, the color difference signal $(R-Y)m$ is made concurrent with the color difference signal $(B-Y)n+1$ by delaying the former for the period of $\frac{1}{2}H$. Then, at the same time, the phase of the luminance signal is caused to coincide with that of the color difference signal of an even-number line by delaying the luminance signal for the period of $\frac{1}{2}H$. In the event of a reproducing operation on the odd-number field, however, if the concurrence obtaining process is performed in the above-stated manner, the Y signal (luminance signal) would be delayed $\frac{1}{2}H$ behind the color difference signal because the color difference signal of the odd-number line is not processed through the delay line 80 in that instance. To compensate for this time difference, $\frac{1}{2}H$ delay lines 90 and 100 are included in the color difference signal processing system. Accordingly, the color difference signal processing system further includes a field switch SWB which is arranged to have both the color difference signals delayed by the period of $\frac{1}{2}H$ separately from the operation of the delay line 80 during the reproduction of the odd-number field and not to delay them during the reproduction of the even-number field.

(iii) Discrimination of the color difference line sequential signals for each field: In the case of FIG. 1, both the odd-number and even-number fields begin with the color difference signal $R-Y$ (or $B-Y$) while, in the case of FIG. 1B, these fields begin with different color difference signals $R-Y$ and $B-Y$ (or $B-Y$ and $R-Y$), respectively. In these different cases, the concurrence obtaining process on the color difference signals and the polarity of the field switch SWB differ between these cases. It is therefore necessary to carry out the concurrence obtaining process after identifying the color difference signal with which each field begins.

Referring to FIG. 2, color difference identifying circuits 120 and 121 are arranged to identify the color difference signals with which the odd-number and even-number fields begin The results of the identifications which are produced from these circuits 120 and 121 are supplied to a discrimination circuit 130 The circuit 130 discriminates the state of the color difference signal of each field. The result of discrimination thus obtained is supplied to a change-over inverting circuit 140. A multiplexer 70 is also arranged to receive the output of the discrimination circuit 140 and to switch over the connections of its input terminals 1a and 2a to output terminals 1b and 2b according to the signal of the circuit 70. Meanwhile, the field switch SWB is arranged to have its polarity switched over from one polarity to the other under the control of a control signal coming from the change-over inverting circuit 140. Another multiplexer 110 has its connection arranged to have color difference signals $R-Y$ and $B-Y$ always appear at its output terminals 3b and 4b irrespective of the change-over between the supply of the color difference signal $R-Y$ and that of the color difference signal $B-Y$ which takes place at its input terminals 3a and 4a. The embodiment which is basically arranged in the above-stated manner operates as follows:

For example, in a system where one field portion of a video signal is recorded in each of circular tracks on a rotary magnetic sheet and where a reproduced picture is to be obtained by detecting frame information simultaneously from a pair of circular tracks by means of two heads A and B which are aligned in the radial direction of the magnetic sheet (frame picture reproduction), the embodiment operates as follows: The frame information consists of two pieces of the field information which are recorded at an interval of a $\frac{1}{2}H$ period. The information or signals thus detected are amplified to a suitable signal level by the amplifiers 20 and 30. The amplified signals are then supplied to a Y signal processing system and color difference signal processing systems, respectively.

For the odd-number field, the field switch SWA is connected to its contact FiO to allow the signal detected by the head A, which is for the odd-number field, to be supplied to the Y signal processing system. The Y signal is FM demodulated by a luminance demodulator 40. The demodulated Y signal plus a synchronizing signal are applied to the $\frac{1}{2}H$ delay line 50 to be delayed by a $\frac{1}{2}H$ period. The output of the delay line 50 is supplied to the encoder 150.

Meanwhile, the output signals of the amplifiers 20 and 30 are FM demodulated by color difference signal demodulators 60 and 61 into color difference signals. The color difference signals thus obtained are first supplied to the color difference identifying circuits 120 and 121. Following this, the discrimination circuit 130 detects the state of the start color difference signals with which the odd-number and even-number fields begin. In case that both the odd-number and even-number fields begin with the color difference signal $R-Y$, as in the case of FIG. 1A, the discrimination circuit 130 supplies a control signal to the multiplexer 70. This causes the input terminal 1a of the multiplexer to be connected to its output terminal 1b and its input terminal 2a to the output terminal 2b, respectively. As a result, the multiplexer 70 produces the color difference signal of the odd-number field from the terminal 1b and that of the even-number field from the terminal 2b respectively. Conversely, in case that the odd-number field begins with the color difference signal R−Y and the even-number field with the color difference signal B−Y, the multiplexer 70 has its input terminal 1a connected to the terminal 2b and the terminal 2a to the terminal 1b. Assuming that the color difference signal (B−Y)n+1 of the odd-number field and the color difference signal (B−Y)m+1 are respectively produced from the output terminals 1b and 2b, the ½H delay line 80 produces the signal of a line m because the signal (B−Y)m+1 is delaying by ½H from 1H from the signal (B−Y)n+1 from the beginning. In other words, in this instance, the color difference signal (B−Y)n+1 of the odd-number field and the color difference signal (R−Y)m of the even-number field are caused to become concurrent as indicated by the arrow 11 in FIG. 1A.

Further, since the color difference signal outputs which have been caused to become concurrent pass through the ½H delay lines 90 and 100, the time difference between the color difference signals thus obtained and the Y signal which comes through the ½H delay line 50 becomes zero. A field switch SWB is connected to contacts FiO in the same manner as the switch SWA. Therefore, the color difference signal (B−Y)n+1, which is produced from the delay line 90 is supplied to the input terminal 3a of the multiplexer 110 and the color difference signal (R−Y)m to the input terminal 4a of the multiplexer, respectively.

Following the above-stated reproducing operation on the odd-number field, a reproducing operation is performed on the even-number field In this instance, the connecting positions of the field switches SWA and SWB are shifted to their contacts FiE In other words, as mentioned in the foregoing, there is no time difference between the Y (luminance) signal and the color difference signals which have been made concurrent in the case of reproduction of the even-number field Therefore, in this case, the use of the delay lines 90 and 100 is not required.

The information of the odd-number and even-number fields is thus processed via the field switches SWA and SWB to obtain a reproduced frame picture.

In another embodiment, in addition to the frame picture reproducing function of FIG. 2, there is provided an additional function whereby a reproduced frame picture can be obtained from only one field portion of a video signal recorded in a single circular recording track on the magnetic sheet (field picture reproducing function).

Figure 3:
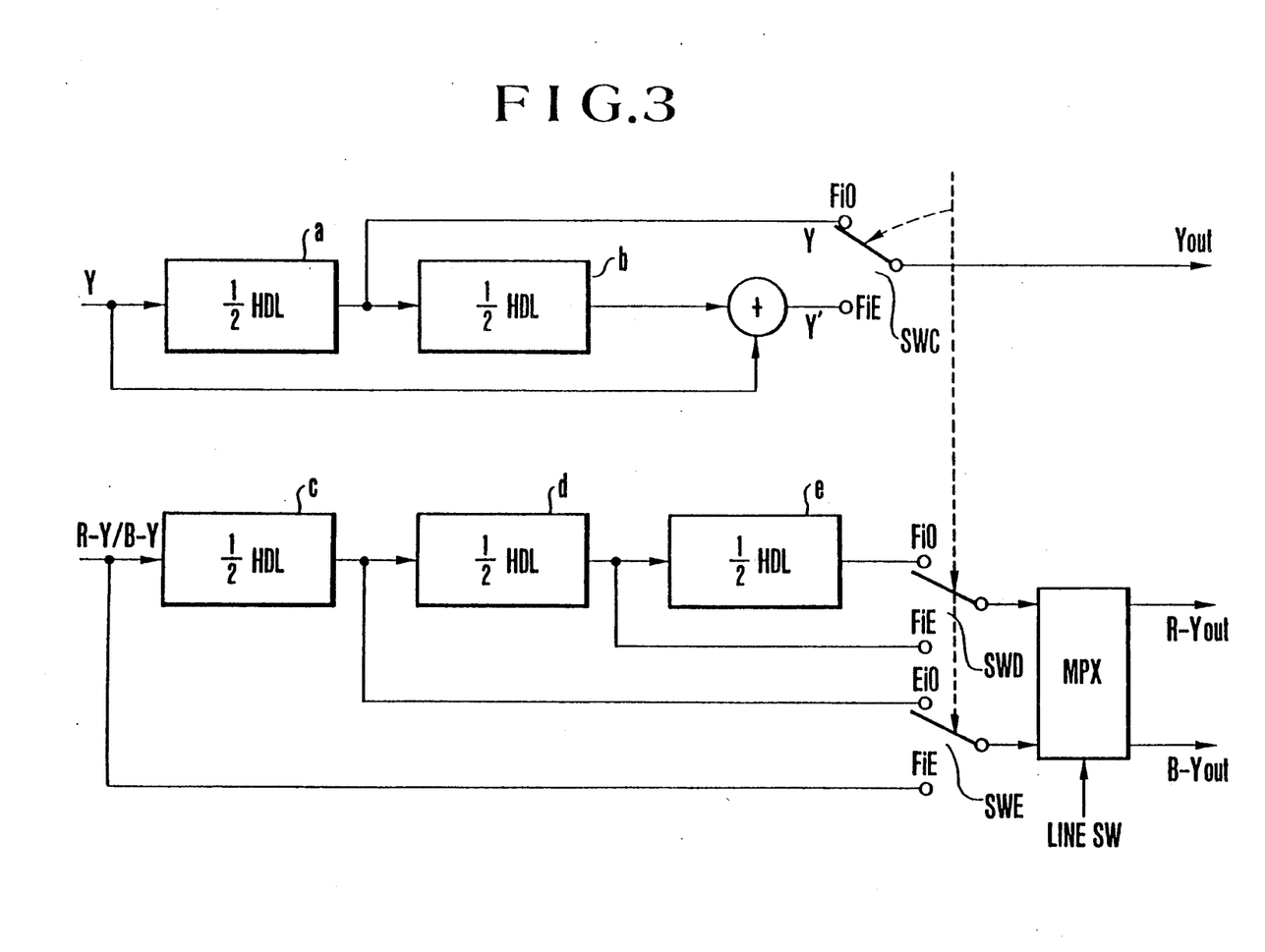
FIG. 3 is a block diagram showing the principle of a field reproducing operation.
Figure 4:
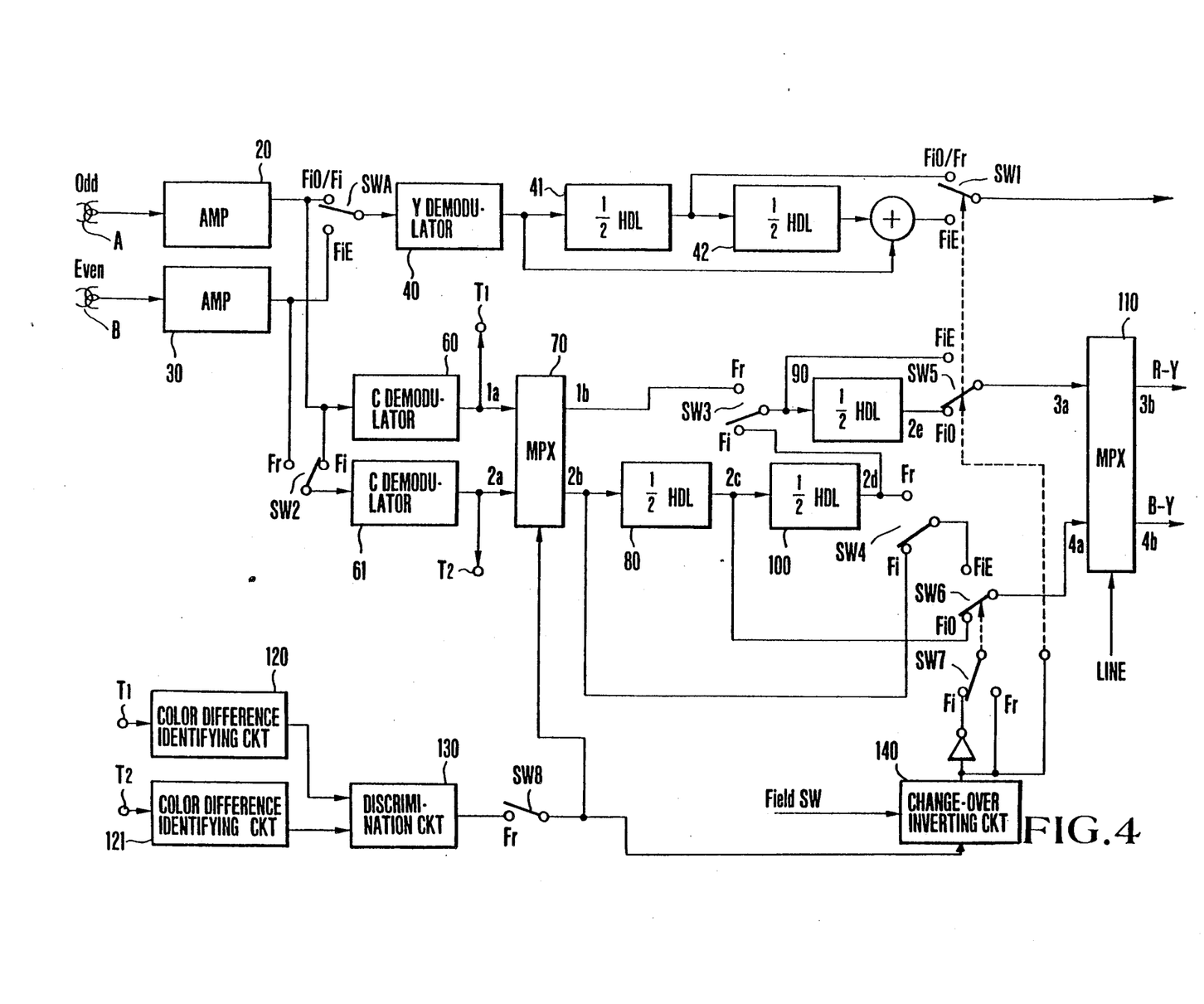
FIG. 4 is a block diagram showing a second embodiment of this invention.

FIG. 3 shows the principle of this field reproducing operation. FIG. 4 shows in a block diagram the arrangement of a field/frame reproducing apparatus.

Referring first to FIG. 3, the field reproducing principle is briefly described as follows: Known methods for having only one field portion of a video signal reproduced on a display device such as a TV receiver or the like include: A method of using one and the same signal for both the odd-number and even-number fields; and another method whereby interpolation is carried out by utilizing vertical correlativity. However, in an embodiment of this invention, the Y signal is interpolated while the color difference signals are arranged to have one and the same signal delayed.

For the odd-number field, the connecting positions of switches SWC to SWE are at their contacts FiO; and the Y signal and the color difference line sequential signal are skew corrected with these signals shifted by ½H via ½H delay lines a and c, respectively. Then, the color difference line sequential signal is further delayed for a period of ½H by means of ½H delay lines d and e to become concurrent with the output signal of the above-stated ½H delay line c. The color difference line sequential signal is then supplied to a multiplexer MPX to be transformed into continuous color difference signals R−Y and B−Y.

In the even-number field, the connecting positions of the switches SWC, SWD and SWE are at their contacts FiE. The Y signal is delayed for a 1H period through the ½H delay lines a and b and is averaged with a signal of 0H (zero horizontal scanning period) which is not delayed. The Y signal is thus processed into a luminance interpolation signal Y'. The color difference line sequential signal is delayed for a 1H period through the delay lines c and d and is thus caused to become concurrent with the signal of 0H. After that, the line sequential signal is supplied to the multiplexer MPX to be transformed into continuous color difference signals.

There is thus obtained a video signal of artificial frame arrangement. As apparent from comparison with the block diagram of FIG. 2, the field/frame reproducing operation of the embodiment becomes possible by just adding one ½H delay line to the Y signal processing system of FIG. 2 and by using other elements without changing them.

FIG. 4 shows a second embodiment of this invention which is arranged on the principle described above. In FIG. 4, the same component elements as those shown in FIG. 2 are indicated by the same reference numerals and are omitted from the following description. The description mainly covers the operation of a field/frame change-over switch. A switch contact Fr is selected for frame reproduction. A switch contact Fi is selected for field reproduction. The switch contacts FiO and FiE are arranged to be used for the odd-number and even-number fields in the event of field reproduction in the same manner as in the preceding embodiment.

In performing the frame reproduction, switches SW1, SW2, SW3, SW4, SW7 and SW8 are all connected to their contacts Fr while the circuit arrangement remains unchanged from that of FIG. 2.

In the case of field reproduction, the connecting position of a switch SWA is shifted to its contact FiO/Fi and that of a switch SW1 shifted between its contacts FiO/Fr and FiE for every field. The Y signal processing system of FIG. 3 is composed of ½H delay lines 41 and 42. Meanwhile, in the color difference signal processing systems, only the signal produced by the head A is used for field reproduction. More specifically, the signal detected by the head A is supplied to a demodulator 61 via a switch SW2 to be FM demodulated. The demodulated signal is produced from the output terminal 2b of the multiplexer 70. Since the switch SW8 is off at the time of field reproduction, the multiplexer 70 has its input terminal 2a connected to its output terminal 2b. The output terminal 2b is connected via the switch SW4 to the contact FiE of the switch SW6. For the even-number field, the output terminal 2b of the multiplexer 70 is connected to the input terminal 4a of the multiplexer 110 while the output 2d of a delay line 100 is supplied to the input terminal 3a of the multiplexer 110. For the odd-number field, the output 2c of a delay line 80 is supplied to the input terminal of the multiplexer 110 while the output 2e of a delay line 90 is supplied to the input terminal 3a of the multiplexer 110. The delay lines 80, 100 and 90, which are ½H delay lines thus correspond respectively to the delay lines c, d and e shown in FIG. 3.

In this instance, however, the switch SW6 operates in a manner reverse to its operation performed for frame reproduction. Therefore, the output of the change-over inverting circuit 140 is supplied to the switch SW6 through an inverter.

The frame/field reproduction thus can be accomplished. It is a feature of the embodiment described that each of the delay lines can be utilized also for the purpose of correcting any drop-out that takes place during the process of detecting information recorded on a disc or a recording medium.

Figure 5A:
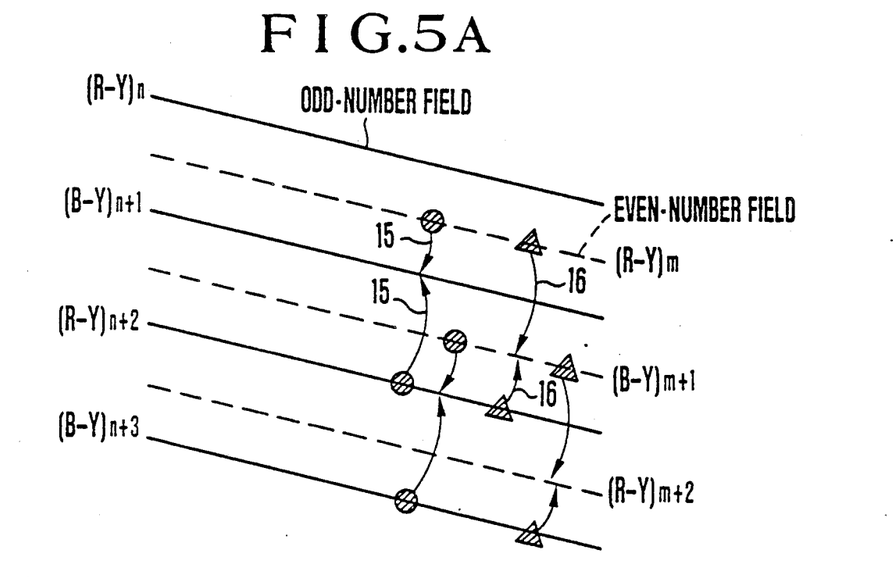
FIGS. 5A and 5B are schematic illustrations of color difference line sequential signals showing a third embodiment of the invention.
Figure 5B:
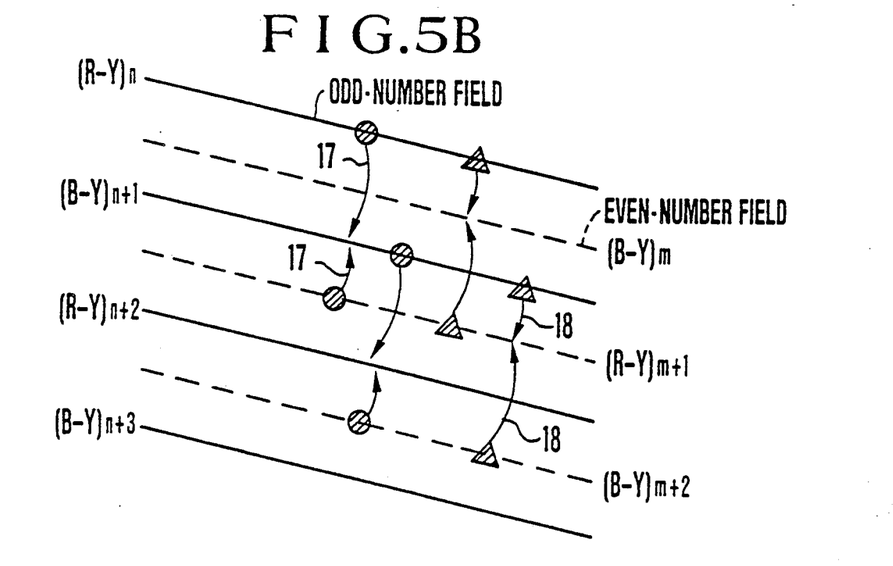
Figure 6:
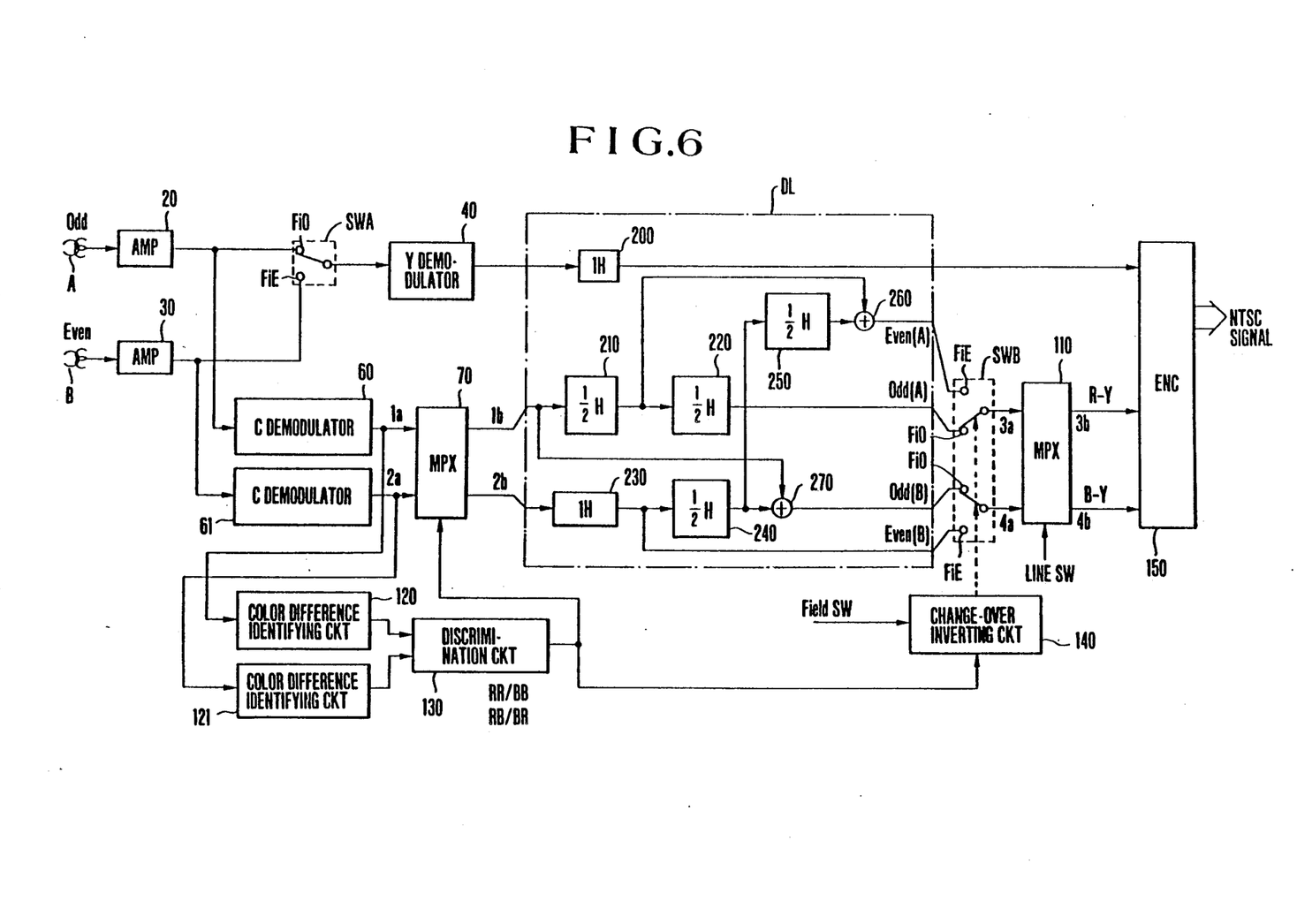
FIG. 6 is a circuit block diagram showing circuit arrangement embodying this invention as the third embodiment thereof.

FIGS. 5A and 5B schematically show color difference signals for the purpose of illustrating a third embodiment of this invention. FIG. 5A represents a case where both the odd-number and even-number fields begin with the same color difference signal. FIG. 5B represents another case where the two fields begin with different color difference signals. In the case of FIG. 5A, in reproducing a line n+1 of the odd-number field, for example, the signal of the same line is used for a luminance signal Yn+1 (which is not shown in the drawing) and a color difference signal (B−Y)n+1. For a drop-out color difference signal (R−Y)n+1, a color difference computed signal obtained from a color difference signal (R−Y)m of a line which is located spatially closest and a color difference signal (R−Y)n+2 are used as indicated by arrows 15. In the case of FIG. 5B, a color difference computed signal obtained from a signal (R−Y)n and a signal (R−Y)m+1 are used for the drop-out signal. In reproducing a line m+1 of the even-number field, the signal of the same line is used for a luminance signal Ym+1 and a color difference signal (B−Y)m+1, or a signal (R−Y)m+1 is used in the case of FIG. 5B. For a drop-out color difference signal (R−Y)m+1, a color difference computed signal obtained from a color difference signal (R−Y)n+2 of a line which is located spatially closest and a signal (R−Y)m are used as indicated by arrows 16, or signals (B−Y)n+1 and (B−Y)m+2 are used in the case of FIG. 5B as indicated by arrows 18. Thus, it is a feature of this embodiment that the color difference signals which intermittently exist for every line are generated by performing a computing operating on color difference signals of the odd-number or even-number field spatially most closely located. A circuit arrangement which is required for carrying out the above-stated color difference signal computing method is as described below:

FIG. 6 shows, in a block diagram, the circuit arrangement required for carrying out the embodiment described. The same component elements as those shown in FIG. 2 are indicated by the same reference numerals and are omitted from the following description: The circuit arrangement of FIG. 6 differs from that of FIG. 2 in the arrangement of a delay computing circuit DL shown in FIG. 6. Therefore, this delay computing circuit DL is described with reference also to FIG. 5A as follows:

First, the concurrence obtaining process on the color difference signals of the odd-number field and the method for computing the color difference signals will be described. In reproducing the line n+1, for example, the drop-out color difference signal is a signal (R−Y)n+1. As mentioned in the foregoing, this signal is generated by computing the color difference signals (R−Y)m and (R−Y)n+2 as indicated by the arrow 15. In other words, the color difference signal (R−Y)m of the odd-number field is caused to be concurrent with the color difference signal (R−Y)n+2 by delaying it for a period of 1.5H. To carry out this operation, a 1H delay line 230 and a ½H delay line 240 are connected in series to the output terminal 2b of the multiplexer 70. The signal (R−Y)m of the even-number field is thus delayed for the period of 1.5H before it is supplied to a computing device 270. At the same time, the computing device 270 receives the color difference signal (R−Y)n+2 of the odd-number field from the output terminal 1b of the multiplexer 70. Upon receipt of these color difference signals, the computing device 270 performs a computing operation according to a formula shown and supplies its output Odd(B) to one contact FiO of the field switch SWB:

$$\text{Odd}(B) = (R - Y)n + 1 \approx \tfrac{2}{3}(R - Y)m + \tfrac{1}{3}(R - Y)n + 2$$

In the formula, the line m which is spatially close to the line n+1 is more heavily weighted (a coefficient ⅔) than the line n+2 which is spatially farther away. The coefficient ⅔ and ⅓ are of course given by way of example. However, a signal Odd(B)=(R−Y)n+1 which is thus obtained by the above-stated computation is temporarily located on the line n+2. This, therefore, necessitates removing a time difference by also delaying a luminance signal Yn+1. For that purpose, a 1H delay line 200 is connected to the output terminal of the FM demodulator 40 which is provided for the Y signal. Further, the color difference signal (B−Y)n+1 which is produced from the output terminal 1b, likewise must be temporarily delayed to the line n+2. Therefore, ½H delay lines 210 and 220 are connected in series to the output terminal 1b. The output Odd(A) of the delay line 220 is supplied to the other contact FiO of the field switch SWB.

Such being the arrangement, the color difference signals Odd(A) and Odd(B), or (B−Y)n+1 and (R−Y)n+1, which coincide in delay time, are supplied to the input terminals 3a and 4a of the multiplexer 110. Then, the color difference signals (R−Y)n+1 and (B−Y)n+1 are supplied from the output terminals 3b and 4b of the multiplexer 110 to an encoder 150. At the same time, the Y (luminance) signal Yn+1 is also supplied to the encoder 150.

Further, in reproducing the line n+2, the input terminals 3a and 4a of the multiplexer 110 receive signals Odd(A) and Odd(B), or color difference signals (R−Y)n+2 and (B−Y)n+2≈⅓ (B−Y)n+3+⅔ (B−Y)m+1. Therefore, the relation between the color difference signals R−Y and B−Y becomes converse as compared with the reproduction of the line n+1. However, since the positions of the multiplexer 110 are arranged to be switched over as mentioned in the foregoing, signals are supplied in a prescribed manner to the encoder 150.

Next, the concurrence obtaining process on the color difference signals of the even-number field and the method for computing the color difference signals are as follows: In this case, the connecting positions of the field switches SWA and SWB are respectively at their contacts FiE. In reproducing line m+1, for example, the 1H delay line 200 brings the Y signal to the temporal position of the line m+2. This necessitates delaying also the color difference signal (B−Y)m+1 by the period of 1H. As a results, the output of the 1H delay line 230 is produced at one contact FiE of the field switch SWB as a signal Even(B) In this instance, Even(B)=(-B−Y)m+1. Further, a drop-out color difference signal (R−Y)m+1 is obtained by a computing operation on the color difference signal (R−Y)m of the even-number field and the color difference signal (R−Y)n+2 of the odd-number field. For this purpose, the color difference signal (R−Y)m of the output terminal 2b of the multiplexer 70 must be delayed for a 2H period to bring it to the line m+2. Hence, this color difference signal is first delayed as much as a 1.5H period by means of the 1H delay line 230 and the ½H delay line 240. After that, the signal is further delayed by another ½H delay line 250. The color difference signal (R−Y)m is thus delayed by a total of 2H period before it is supplied to a computing device 260.

Meanwhile, the color difference signal (R−Y)n+2 of the odd-number field is delayed by just a ½H period, i.e. to bring it a line m+2. Therefore, the color difference signal (R−Y)n+2, which is produced from the output terminal 1b of the multiplexer 70, is supplied via the ½H delay line 210 to the computing device 260.

The color difference signals (R−Y)m and (R−Y)n+2, which are thus caused to be concurrent with each other, are received by the computing device 260. The computing device 260 performs a computation in the same manner as the computing device 270 The computing device 260 thus produces an output signal Even(A), which is then supplied to the other contact FiE of the field switch SWB. There obtains the following relation:

$$\text{Even}(A) = (R - Y)m + 1 \approx \tfrac{1}{3}(R - Y)n + 2 + \tfrac{1}{3}(R - Y)m$$

The signals Even(A) and Even(B), which are thus obtained from the color difference signals (R−Y)m+1 and (B−Y)m+1, are supplied to the input terminals 3a and 4a of the multiplexer 110. These signals are then supplied in the same order to the encoder 150. The Y signal Ym+1 and the color difference signals (R−Y)m+1 and (B−Y)m+1 are thus supplied to the encoder 150 in their concurrent state.

In case that the start color difference signals of the odd-number and even-number fields differ from each other as in the case of FIG. 5B, the states of the color difference signals are detected jointly by the color difference identifying circuits 120 and 121 and the discrimination circuit 130 in the same manner as in the case of the circuit arrangement shown in FIG. 2. The connecting positions of the multiplexer 70 are inverted according to the result of the detection. The change-over inverting circuit 140 also reversely operates as required. The concurrence obtaining operation in the direction of arrow 17 or 18 as shown in FIG. 5B and a computing operation are carried out in this manner. More specifically, in reproducing the line n+1 of the odd-number field, for example, the color difference signal (R−Y)n is produced from the output terminal 2b of the multiplexer 70 to be supplied via the delay lines 230, 240 and 250, for a total of 2H delay, to the computing device 260. Meanwhile, the color difference signal (R−Y)m+1 of the even-number field is produced from the output terminal 1b of the multiplexer 70 to be supplied via the ½H delay line 210 to the computing device 260. The computing device 260 then performs the same computing operation as the operation described in the foregoing. As a result, a signal Even(A)=⅓ (R−Y)n+⅔ (R−Y)m+1 is supplied to the input terminal 3a of the multiplexer 110 via the field switch SWB.

The concurrence obtaining operation indicated by the arrows 17 and the computing operation are thus carried out in the above-stated manner. In another case indicated by arrows 18, the operation is performed in a manner similar to the operations indicated by other arrows 16 and 17 and therefore requires no further description.

Further, it is of course possible to have the circuit arrangement for field/frame reproduction of FIG. 3 added to the circuit arrangement of FIG. 6.

What is claimed is:

1. A video signal processing apparatus comprising:
   a) input means for receiving color difference line sequential signals of odd-number and even-number fields through separate channels; and
   b) concurrence obtaining means for causing said color difference line sequential signals of said odd-number field and said color difference line sequential signals of said even-number field received through said separate channels to become concurrent with each other.

2. An apparatus according to claim 1, wherein said input means includes means for reading out signals through separate channels both from a first store means, in which said color difference line sequential signals of said odd-number field are stored, and from a second store means, in which said color difference line sequential signals of said even-number field are stored.

3. An apparatus according to claim 2, wherein said first store means and said second store means are a recording medium, and said reading means includes two reproducing means for separately reproducing said color difference line sequential signals of said odd-number and even-number fields which are recorded on first and second parts of said recording medium which differ from each other.

4. An apparatus according to claim 1, wherein said concurrence obtaining means includes means for combining a first of the color difference signals of one of said odd-number and even-number fields with a second of the color difference signals of another field of said odd-number and even-number fields.

5. An apparatus according to claim 1, wherein said concurrence obtaining means includes means for combining a first of the color difference signals of one of said odd-number and even-number fields with a first of the color difference signals of another field of said odd-number and even-number fields.

6. A video signal reproducing method wherein color difference signals which have been adjusted to be concurrent are generated through (a) a step of concurrently reproducing the odd-number and even-number field portions of a video signal including color difference line sequential signals; and (b) a step of interpolating a drop-out color difference signal of a horizontal scanning line by a computing operation on the color difference line sequential signals of said odd-number and even-number fields concurrently obtained.

7. A video signal processing apparatus comprising:
   a) signal generating means for concurrently producing the odd-number and even-number field portions of a video signal including color difference line sequential signals; and b) concurrence obtaining means for forming color difference signals which are adjusted to be concurrent by forming a color difference signal for at least one of said odd-number and even-number fields from one of the color difference signals of said odd-number field and one of the color difference signals of said even-number field.

8. An apparatus according to claim 7, wherein said signal generating means includes means for reading out signals through separate channels both from a first store means, in which said color difference line sequential signals of said odd-number field are stored, and from a second store means in which said color difference line sequential signals of said even-number field are stored.

9. An apparatus according to claim 8, wherein said first store means and said second store means are a recording medium, and said reading means includes two reproducing means for separately reproducing said color difference line sequential signals of said odd-number and even-number fields recorded on first and second parts of said recording medium which differ from each other.

10. An apparatus according to claim 7, wherein said concurrence obtaining means is arranged to compensate for a first of the color difference signals of at least one of said odd-number and even-number fields by using a first of the color difference signals of said odd-number field together with a first of the color difference signals of said even-number field.

11. An apparatus according to claim 4, wherein said first color difference signal is a line sequential R−Y signal and said second color difference signal is a line sequential B−Y signal.

12. An apparatus according to claim 5, wherein said first color difference signal is a line sequential R−Y signal and said second color difference signal is a line sequential B−Y signal.

13. A video signal reproducing method according to claim 6, further comprising:
(c) a step of outputting interpolated signals to an external device.

14. A video signal reproducing method according to claim 13, wherein said color difference line sequential signals include a line sequential R−Y signal and a line sequential B−Y signal.

15. An apparatus comprising:
(a) means for receiving line sequential signals of odd-number and even-number fields, said fields being interlaced with each other; and
(b) means for converting said line sequential signals into line concurrent signals by using signals of both said odd-number fields and said even-number fields.

16. An apparatus according to claim 15, wherein said line sequential signals include line sequential color differential signals.

17. An apparatus according to claim 15, wherein said odd-number fields and said even-number fields are supplied through different channels.

18. An apparatus according to claim 15, wherein said odd-number and even-number fields are recorded at different positions on a recording medium.

19. A video signal processing method, comprising:
(a) receiving line sequential signals of a plurality of fields, said fields being interlaced with each other, and
(b) converting said line sequential signals of each of said plurality of fields into line concurrent signals by using signals of at least both adjacent fields.

20. A method according to claim 19, wherein said line sequential signals include line sequential color differential signals.

21. A method according to claim 19, wherein said plurality of fields are supplied through different channels.

22. A method according to claim 19, wherein each of said plurality of fields is recorded at different positions on a recording medium.

23. An apparatus according to claim 15, wherein said converting means includes delay means for delaying said line sequential signals.

24. An apparatus according to claim 18, and further comprising reproducing means for reproducing the fields recorded on said recording medium.

25. An apparatus according to claim 16, and further comprising means for supplying a luminance signal with said line sequential color differential signals.

26. An apparatus according to claim 25, and further comprising means for synchronizing said luminance signal with said line concurrent signals.

27. A method according to claim 19, wherein said converting step includes delaying said line sequential signals.

28. A method according to claim 22, and further comprising the step of reproducing each of said plurality of field recorded on the recording medium.

29. A method according to claim 22, and further comprising the step of supplying a luminance signal with said line sequential color difference signals.

30. A method according to claim 29, and further comprising the step of synchronizing said luminance signal with said line concurrent signals.

31. A method according to claim 16, wherein said line sequential color differential signals include a R−Y signal and a B−Y signal.

32. A method according to claim 22, wherein said line sequential color differential signals include a R−Y signal and a B−Y signal.

33. A video signal processing apparatus, comprising:
(a) means for receiving line sequential signals of a plurality of fields which are interlaced with each other; and
(b) means for converting said line sequential signals of each of said plurality of fields into line concurrent signals by using signals of at least both adjacent fields.

* * * * *